United States Patent
Zhou

(10) Patent No.: US 11,443,701 B2
(45) Date of Patent: Sep. 13, 2022

(54) SCREEN STATE CONTROL METHOD, DEVICE, AND MOBILE TERMINAL

(71) Applicant: GUANGDONG OPPO MOBILE TELECOMMUNICATIONS CORP., LTD., Guangdong (CN)

(72) Inventor: Yibao Zhou, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 184 days.

(21) Appl. No.: 16/631,830

(22) PCT Filed: Jun. 13, 2018

(86) PCT No.: PCT/CN2018/091077
§ 371 (c)(1),
(2) Date: Jan. 16, 2020

(87) PCT Pub. No.: WO2019/015416
PCT Pub. Date: Jan. 24, 2019

(65) Prior Publication Data
US 2020/0168165 A1  May 28, 2020

(30) Foreign Application Priority Data
Jul. 18, 2017  (CN) .................. 201710585155.X

(51) Int. Cl.
G09G 3/34  (2006.01)
G01V 8/10  (2006.01)

(52) U.S. Cl.
CPC ............ *G09G 3/3406* (2013.01); *G01V 8/10* (2013.01); *G09G 2360/144* (2013.01)

(58) Field of Classification Search
CPC .. G09G 3/3406; G09G 2360/144; G01V 8/10; H04M 1/72448; H04M 1/72454; H04M 2250/12
See application file for complete search history.

(56) References Cited

U.S. PATENT DOCUMENTS 8,373,648 B2 *  2/2013  Shih .................... H05B 47/115
345/82
8,929,538 B2 *  1/2015  Liu ....................... H04M 1/605
379/433.02

(Continued)

FOREIGN PATENT DOCUMENTS

CN  102301684  12/2011
CN  102917183  2/2013

(Continued)

OTHER PUBLICATIONS

WIPO, ISR for PCT/CN2018/091077, dated Sep. 4, 2018.

(Continued)

*Primary Examiner* — Benyam Ketema
(74) *Attorney, Agent, or Firm* — Hodgson Russ LLP

(57) ABSTRACT

A screen state control method, device, and a mobile terminal are provided. The method includes: in a bright environment, a ratio of a characteristic curve of a proximity sensor to an ideal curve of the proximity sensor in each of a number of intervals is determined; a first intensity value of a receiving end signal is obtained, a second intensity value of a receiving end signal is turned off is obtained, the first intensity value and the second intensity value respectively according to the ratios are compensated; and a corrected proximity value of the proximity sensor according to a compensated first intensity value and a compensated second intensity value is determined, and the screen, according to a comparison result between the corrected proximity value and a (Continued)

preset threshold, is controlled to be selectively in a screen on state or a screen off state.

16 Claims, 8 Drawing Sheets

(56) References Cited

U.S. PATENT DOCUMENTS

| | | | |
|---|---|---|---|
| 9,063,010 B2* | 6/2015 | Wu | G01J 5/10 |
| 9,146,304 B2 | 9/2015 | Land et al. | |
| 9,573,807 B1* | 2/2017 | Kaufman | B82Y 25/00 |
| 10,331,271 B2* | 6/2019 | Wojzischke | B60K 37/06 |
| 2002/0073130 A1* | 6/2002 | Haines | G06Q 10/107 |
| | | | 718/102 |
| 2008/0122803 A1* | 5/2008 | Izadi | G06F 3/0421 |
| | | | 345/173 |
| 2008/0150913 A1* | 6/2008 | Bell | G06F 3/011 |
| | | | 345/175 |
| 2009/0121889 A1* | 5/2009 | Lin | G06F 1/3231 |
| | | | 340/686.6 |
| 2011/0310005 A1* | 12/2011 | Chen | G06F 1/3262 |
| | | | 345/156 |
| 2012/0019149 A1* | 1/2012 | Shih | H05B 47/115 |
| | | | 315/149 |
| 2012/0049048 A1* | 3/2012 | Dyer | G01J 1/44 |
| | | | 250/214 AL |
| 2012/0050189 A1* | 3/2012 | Choboter | H04M 1/72463 |
| | | | 345/173 |
| 2012/0129579 A1* | 5/2012 | Tam | G01S 7/481 |
| | | | 455/575.1 |
| 2012/0232836 A1* | 9/2012 | Ohmi | G06F 3/0308 |
| | | | 702/150 |
| 2014/0113686 A1* | 4/2014 | Guo | H04M 1/026 |
| | | | 250/252.1 |
| 2015/0138583 A1* | 5/2015 | Miyahara | H04N 1/00832 |
| | | | 358/1.13 |
| 2016/0066393 A1* | 3/2016 | Bosua | H05B 45/20 |
| | | | 315/307 |
| 2018/0211634 A1* | 7/2018 | Zhou | G01S 17/04 |
| 2018/0233113 A1* | 8/2018 | Zhou | G01S 17/04 |
| 2019/0034722 A1* | 1/2019 | Zhou | G09G 3/3406 |
| 2020/0137215 A1* | 4/2020 | Zhou | G01S 7/4876 |
| 2020/0168165 A1* | 5/2020 | Zhou | G09G 3/3406 |

FOREIGN PATENT DOCUMENTS

| | | | | |
|---|---|---|---|---|
| CN | 105915717 | * | 8/2016 | G06F 3/0484 |
| CN | 106020423 | | 10/2016 | |
| CN | 106303021 | | 1/2017 | |
| CN | 106357922 | | 1/2017 | |
| CN | 106506794 | | 3/2017 | |
| CN | 107257414 | | 10/2017 | |

OTHER PUBLICATIONS

SIPO, First Office Action for CN Application No. 201710585155.X, dated Mar. 5, 2019.
IPI, Office Action for IN Application No. 202017005758, dated May 24, 2021.

* cited by examiner

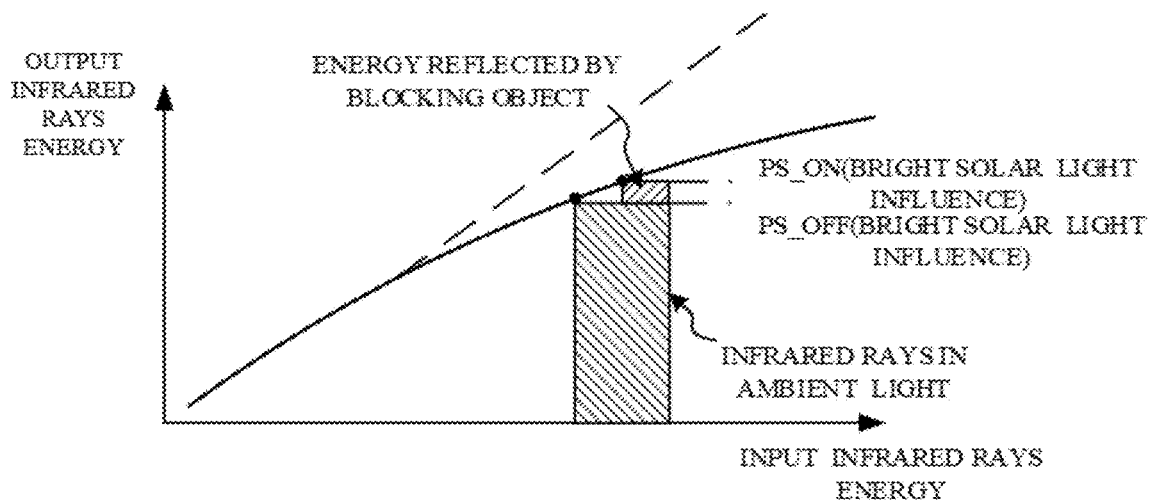

FIG. 3B

| A RATIO OF A CHARACTERISTIC CURVE OF A PROXIMITY SENSOR TO AN IDEAL CURVE OF THE PROXIMITY SENSOR, IN EACH OF A NUMBER OF INTERVALS, IS DETERMINED, IN A BRIGHT ENVIRONMENT. | S410 |
|---|---|
| A FIRST INTENSITY VALUE OF A RECEIVING END SIGNAL WHEN A TRANSMITTING END OF THE PROXIMITY SENSOR IS TURNED ON IS OBTAINED, AND A SECOND INTENSITY VALUE OF A RECEIVING END SIGNAL WHEN THE TRANSMITTING END OF THE PROXIMITY SENSOR IS TURNED OFF IS OBTAINED, THE FIRST INTENSITY VALUE AND THE SECOND INTENSITY VALUE ARE RESPECTIVELY COMPENSATED ACCORDING TO A RATIO CORRESPONDING TO AN INTERVAL WHERE THE FIRST INTENSITY VALUE BELONGS TO AND A RATIO CORRESPONDING TO AN INTERVAL WHERE THE SECOND INTENSITY VALUE BELONGS TO | S420 |
| A CORRECTED PROXIMITY VALUE OF THE PROXIMITY SENSOR IS DETERMINED ACCORDING TO A COMPENSATED FIRST INTENSITY VALUE AND A COMPENSATED SECOND INTENSITY VALUE, AND THE SCREEN IS CONTROLLED, ACCORDING TO A COMPARISON RESULT BETWEEN THE CORRECTED PROXIMITY VALUE AND A PRESET THRESHOLD, TO BE SELECTIVELY IN A SCREEN ON STATE OR A SCREEN OFF STATE | S430 |

FIG. 4

```
┌─────────────────────────────────────────────────────────────────┐
│ THE CHARACTERISTIC CURVE OF THE PROXIMITY SENSOR IS DIVIDED INTO A │
│ NUMBER OF FIRST LINE SEGMENTS BY THE NUMBER OF INTERVALS, AND THE  │──S610
│ IDEAL CURVE IS DIVIDED INTO A NUMBER OF SECOND LINE SEGMENTS BY THE│
│                   NUMBER OF INTERVALS                              │
└─────────────────────────────────────────────────────────────────┘
                                  ↓
┌─────────────────────────────────────────────────────────────────┐
│ IN EACH OF THE NUMBER OF INTERVALS, A FIRST PATTERN IS FORMED BY THE│
│ FIRST LINE SEGMENT OF THE CHARACTERISTIC CURVE AND THE ORTHOGRAPHIC │──S620
│ PROJECTION OF THE FIRST LINE SEGMENT OF THE CHARACTERISTIC CURVE ON │
│                      THE ABSCISSA AXIS                             │
└─────────────────────────────────────────────────────────────────┘
                                  ↓
┌─────────────────────────────────────────────────────────────────┐
│ IN EACH OF THE INTERVALS, A SECOND PATTERN IS OBTAINED BY THE SECOND│
│ LINE SEGMENT OF THE IDEAL CURVE AND THE ORTHOGRAPHIC PROJECTION OF  │──S630
│   THE SECOND LINE SEGMENT OF THE IDEAL CURVE ON THE ABSCISSA AXIS   │
└─────────────────────────────────────────────────────────────────┘
                                  ↓
┌─────────────────────────────────────────────────────────────────┐
│ THE RATIO OF THE CHARACTERISTIC CURVE TO THE IDEAL CURVE IN EACH OF │
│ THE INTERVALS IS DETERMINED ACCORDING TO AN AREA RATIO OF THE FIRST │──S640
│        PATTERN TO THE SECOND PATTERN IN EACH OF THE INTERVALS       │
└─────────────────────────────────────────────────────────────────┘
```

FIG. 6A

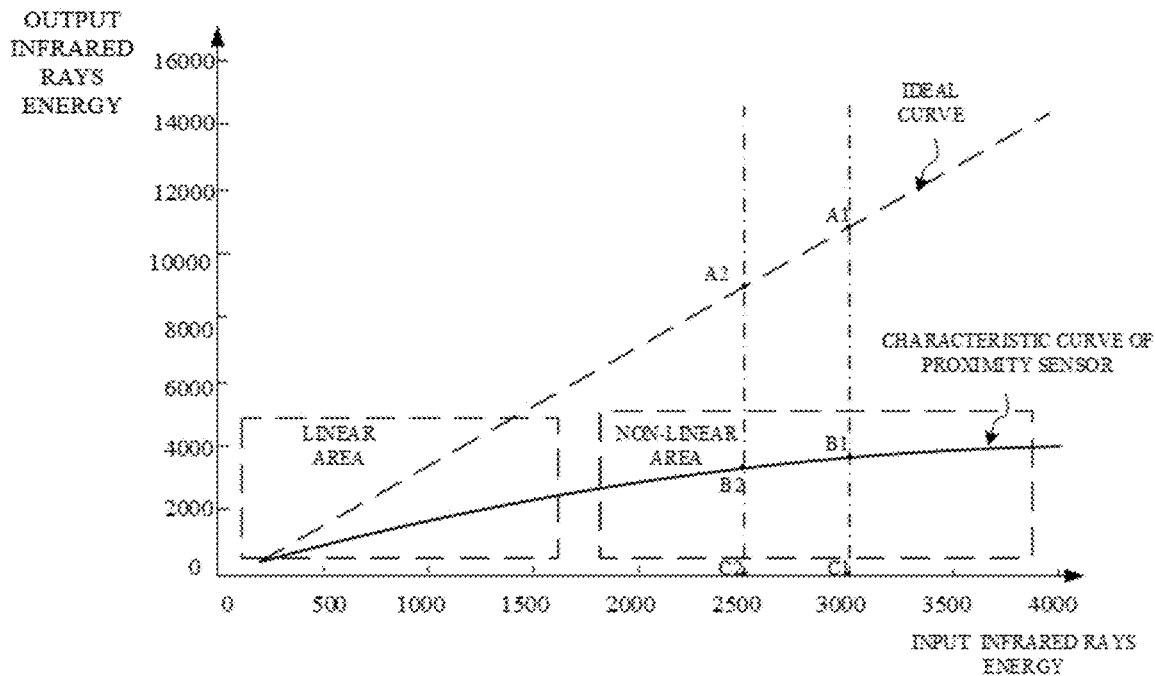

FIG. 6B

SCREEN STATE CONTROL METHOD, DEVICE, AND MOBILE TERMINAL

CROSS-REFERENCE TO RELATED APPLICATION

This application is a U.S. national phase application of International Application No. PCT/CN2018/091077, filed Jun. 13, 2018, which claims priority to Chinese Patent Application No. 201710585155.X, filed Jul. 18, 2017, the entire disclosures of which are incorporated herein by reference.

TECHNICAL FIELD

The present disclosure relates to the field of mobile terminal technologies, for example, to a screen state control method, device, and mobile terminal.

BACKGROUND

As smartphones continue to move toward thinner and lighter, the size of mobile terminal components needs to be smaller and smaller. In order to meet this requirement, a proximity sensor (PS), an ambient light sensor (ALS), and an Infrared Radiation (IR) Light Emitting Diode (LED) are integrated. The integrated sensor is widely used in smartphones.

The smartphone automatically adjusts the brightness of the liquid crystal display (LCD) backlight by monitoring the intensity of the ambient light by ALS, or controls the lighting and turning off of the button light. The infrared LED is used as a transmitting end of the proximity sensor for transmitting infrared rays through the infrared LED during the call, and receiving the intensity value of the infrared light reflected by the face through the receiving end of the proximity sensor, and determining whether the smart phone is close according to the intensity value when the face is close, the LCD backlight can be turned off to save power.

However, the scene in which a user uses a smartphone is complicated and varied. For example, when the intensity of sunlight is very high, the infrared rays in the sunlight are collected by the receiving end of the proximity sensor, so that the intensity of the infrared rays received by the receiving end reaches tens of thousands of lux, and the proportion of the infrared rays emitted by infrared emitting LEDs and received by the receiving end is very small. Since the characteristic curve of the proximity sensor is non-linear, and the linearity tends to be flat with low noise values (such as infrared rays in ambient light) increase. Therefore, in a bright environment, the proximity value will become smaller. At this time, even if the smartphone is close to the face, the backlight of the screen cannot be turned off correctly.

SUMMARY

The disclosure provides a screen state control method, device, storage medium and mobile terminal, which can remove the interference of ambient light and realize the desirable function of screen on and screen off.

The disclosure provides a screen state control method, includes:

Determining, in a bright environment, a ratio of a characteristic curve of a proximity sensor to an ideal curve of the proximity sensor in each of a number of intervals;

Obtaining a first intensity value of a receiving end signal when a transmitting end of the proximity sensor is turned on, and obtaining a second intensity value of a receiving end signal when the transmitting end of the proximity sensor is turned off, and compensating the first intensity value and the second intensity value respectively according to a ratio corresponding to an interval where the first intensity value belongs to and a ratio corresponding to an interval where the second intensity value belongs to;

Determining a corrected proximity value of the proximity sensor according to a compensated first intensity value and a compensated second intensity value, and controlling the screen, according to a comparison result between the corrected proximity value and a preset threshold, to be selectively in a screen on state or a screen off state.

The present disclosure also provides a screen state control device, the device includes:

A ratio determining module configured to determine, in a bright environment, a ratio of a characteristic curve of a proximity sensor to an ideal curve of the proximity sensor in each of a number of intervals;

A signal compensation module configured to obtain a first intensity value of a receiving end signal when a transmitting end of the proximity sensor is turned on, and obtain a second intensity value of a receiving end signal when the transmitting end of the proximity sensor is turned off, and respectively to compensate the first intensity value and the second intensity value respectively according to a ratio corresponding to an interval where the first intensity value belongs to and a ratio corresponding to an interval where the second intensity value belongs to;

A first screen control module configured to determine a corrected proximity value of the proximity sensor according to a compensated first intensity value and a compensated second intensity value, and to control the screen, according to a comparison result between the corrected proximity value and a preset threshold, to be selectively in a screen on state or a screen off state.

The present disclosure also provides a computer readable storage medium storing a computer program that, when executed by a processor, implements a screen state control method as described herein.

The present disclosure also provides a mobile terminal, including a memory, a processor, and a computer program stored on the memory and operable by the processor, the processor executing the computer program to implement a screen state control method as described herein.

The screen state control scheme provided by the present disclosure eliminates the interference of bright ambient light, thus avoiding the problem that the backlight of the screen will not be turned off when the screen being close to a face under bright environment, thereby achieving normal function of screen off and on.

BRIEF DESCRIPTION OF THE DRAWINGS

FIG. 3B illustrates a schematic diagram showing a relationship between a characteristic curve and an ideal curve of a proximity sensor under bright solar light environment according to an embodiment of the present disclosure;

FIG. 4 illustrates a flowchart of a screen state control method according to an embodiment of the present disclosure;

FIG. 6A illustrates a flowchart of a method for determining a ratio of a characteristic curve of an proximity sensor to an ideal curve according to another embodiment of the present disclosure;

FIG. 6B illustrates a schematic diagram of a method for calculating a ratio of a characteristic curve of an proximity sensor to an ideal curve according to another embodiment of the present disclosure;

DETAILED DESCRIPTION

Figure 1:
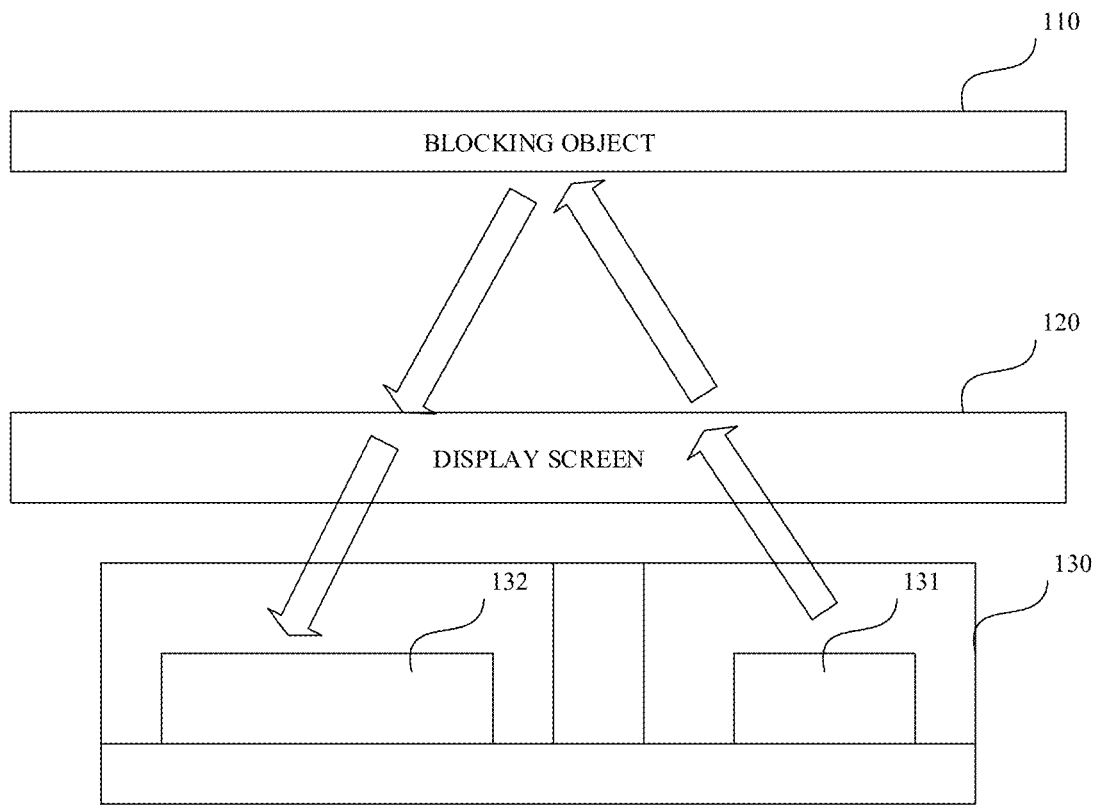
FIG. 1 illustrates a schematic structural diagram of a proximity sensor according to an embodiment of the present disclosure.

The present disclosure will be described below in conjunction with the accompanying drawings and embodiments. It is understood that the specific embodiments described herein are merely illustrative of the disclosure and are not intended to be limiting. In addition, for the convenience of description, only some but not all of the structures related to the present disclosure are shown in the drawings.

It should be noted that prior to discussing the exemplary embodiments, some exemplary embodiments are described as a process or method depicted as a flowchart. Although a flowchart depicts a number of steps as a sequential process, many of the steps in the flowchart can be implemented in parallel, concurrently, or concurrently. In addition, the order of the a number of steps can be rearranged. The process may be terminated when its operation is completed, but may also have additional steps not included in the figures. The processing may correspond to a method, a function, a procedure, a subroutine or a subroutine, and the like.

In general, the function of a proximity sensor is used to turn off the screen, when the user calls and his face is close to the screen, thereby saving power and avoiding false operations. For example, when the user answers or makes a call and his face is close to the phone, the screen is controlled to be turned off. If the user move the phone away from the face, and the proximity sensor is uncovered, the screen is controlled to be lit up.

In order to better understand the working principle of the proximity sensor, FIG. 1 provides a schematic structural diagram of a proximity sensor. As shown in FIG. 1, the proximity sensor 130 includes a transmitting end 131 and a receiving end 132. The infrared LED lamp of the transmitting end 131 emits infrared rays, and the receiving end 132 receives infrared rays. The proximity sensor 130 is disposed in a space formed by the display screen 120 and a housing, and may be disposed near the receiver. When an external blocking object 110 approaches, the infrared rays emitted from the emitting end 131 are reflected by the external blocking object 110 and partially enter the receiving end 132. An internal chip processor of the receiving end 132 includes an Analog-to-Digital Converter (ADC), and an intensity value of the infrared rays entering the receiving end 132 is obtained by the Analog-to-Digital Converter. When there is no object blocking the infrared rays, the intensity of the infrared rays collected by the receiving end 132 is the smallest, and when the object is constantly approaching, the intensity of the infrared rays collected by the receiving end 132 is continuously increased until a full-scale is reached. In an embodiment, the proximity sensor's range is related to the number of bits of the register inside the receiver chip. For example, for an 8-bit register, the full-scale is 256; for a 10-bit register, the full-scale is 1024; for a 12-bit register, the full-scale is 4096, and so on. Then, the intensity value of the infrared rays collected by the receiving end is compared with a preset threshold value, and the display screen is turned on or off according to a comparison result. For example, taking a proximity sensor with a 10-bit register as an example, when there is no object blocking, the proximity value is 50. When the face is very close to the proximity sensor 130, the infrared rays are all reflected to the receiving end, and the proximity value is close to the full-scale, which is about 1024.

In a slight light environment, it is generally required that the screen is turned off when it is 3 cm to 5 cm away from the obstruction, and there is also a distance of far away from the obstruction, that is, an approaching threshold and a leaving threshold are set. When the screen is lit up, the screen will be turned off when the proximity value is greater than the approaching threshold (such as 400); when the backlight of the screen is turned off, the screen will be lit up when the approach value is less than the leaving threshold (such as 300).

Figure 2A:
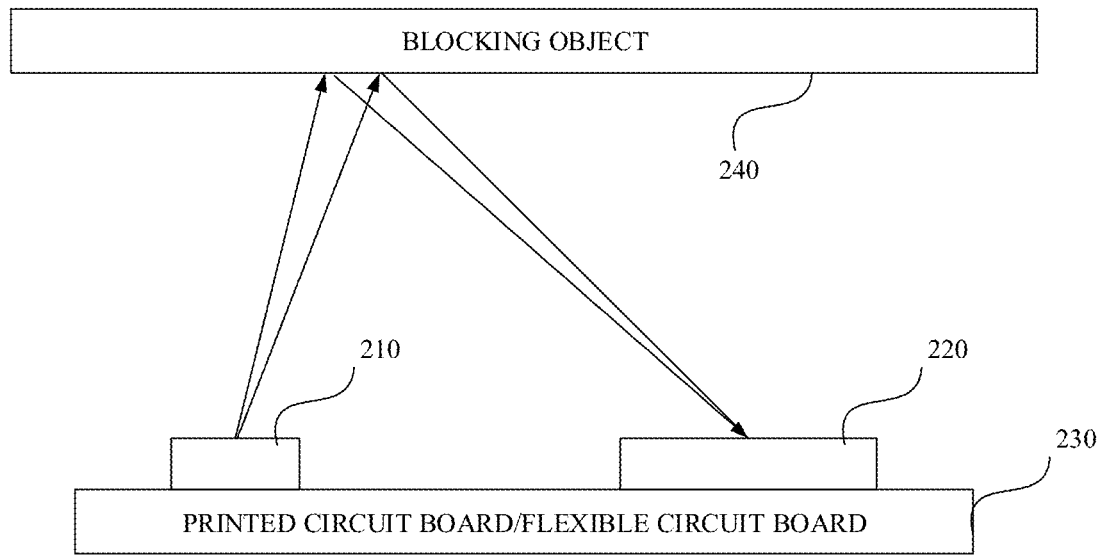
FIG. 2A illustrates a schematic diagram of the operation of a proximity sensor according to an embodiment of the present disclosure.
Figure 2B:
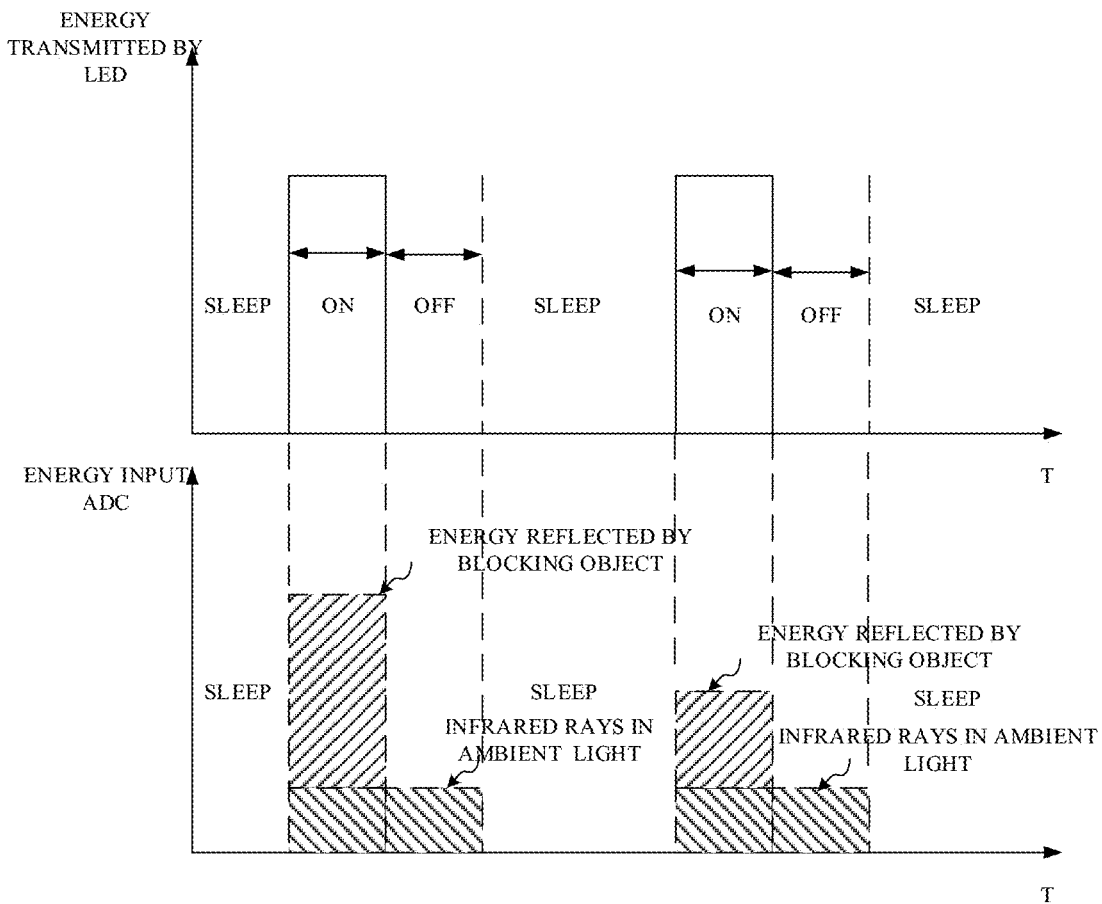
FIG. 2B illustrates a schematic diagram of control logic of a transmitting end and a receiving end of a proximity sensor under bright environment according to an embodiment of the present disclosure.

In order to more vividly represent the working process of the proximity sensor, a schematic diagram of the operation of the proximity sensor is provided by FIG. 2A. As shown in FIG. 2A, the transmitting end 210 of the proximity sensor, that is, the infrared LED lamp, and the receiving end 220 are both disposed on a printed circuit board 230 (or a flexible circuit board), and the transmitting end 210 and the receiving end 220 are separated from each other, that is, infrared rays cannot be directly transmitted from the infrared LED lamp to the receiving end 220. A first driving circuit (not shown) is provided on the printed circuit board 230. According to a control period, the first driving circuit is controlled to output a control pulse as shown in FIG. 2B, to control the infrared LED lamp to be in a mode of a sleep state-an on state (LED ON)-an off state (LED OFF)-a sleep state-and so on. At the same time, a second driving circuit (not shown) is also provided in the printed circuit board 230. The second driving circuit controls, according to the same control period as the above-mentioned period, the receiving terminal 220 to receive infrared rays in a mode of sleep-sampling-sleep-and so on, and acquired infrared signals are transmitted to an analog to digital converter.

In one embodiment, as shown in FIGS. 2A and 2B, the infrared rays emitted by the transmitting end 210 are reflected by a blocking object 240 into the receiving end 220. The receiver 220 performs samplings during the LED ON phases and LED OFF phases. For example, in the bright environment, the receiving end 220 performs samplings twice. The first sampling is to read the infrared intensity value of the receiving end 220 without turning on the infrared LED lamp of the transmitting end 210; the second sampling is to read the infrared intensity value of the receiving end when turning on the infrared LED lamp of the transmitting end 210. The infrared intensity value obtained by the first sampling is input to the analog-to-digital converter of the receiving end chip processor to obtain the first intensity value a, and the infrared intensity value obtained by the second sampling is input to the analog-to-digital converter of the receiving end chip to obtain the second intensity value b. Then, the real infrared signal strength value is b-a. Comparing the real infrared signal strength value with a preset threshold value, whether the phone is in an approaching state or a leaving state relative to the external obstruction can be determined.

Figure 3A:
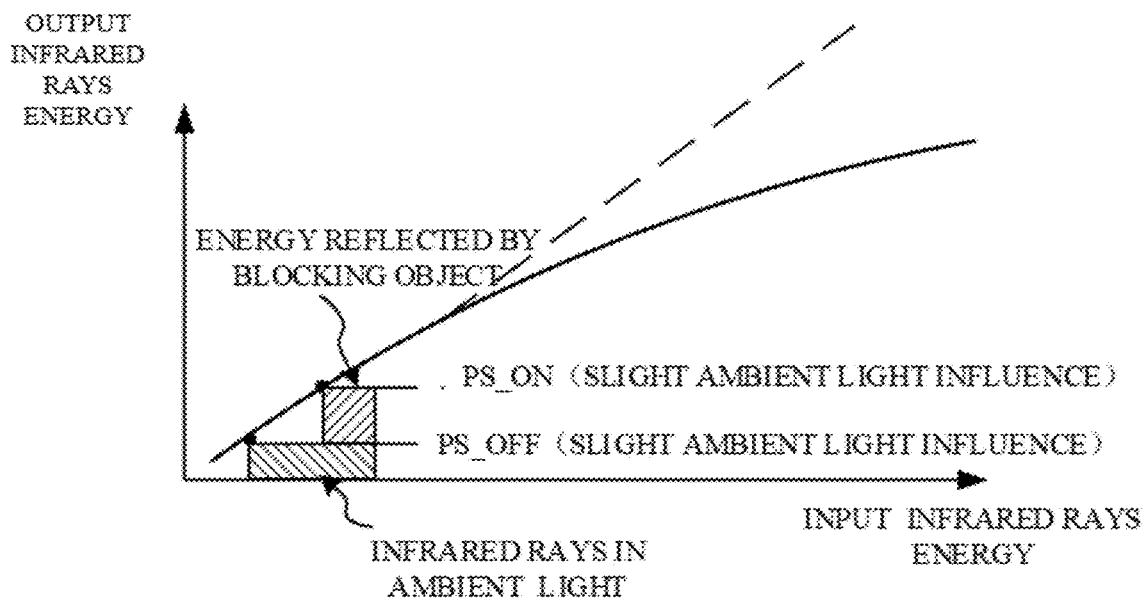
FIG. 3A illustrates a schematic diagram showing the relationship between a characteristic curve and an ideal curve of a proximity sensor under slight ambient light environment according to an embodiment of the present disclosure.

In an embodiment, when the receiver is during a call, the infrared rays emitted by the infrared LED lamp is reflected by the face and transmitted into the receiving end, and the mobile terminal calculates the proximity value by reading the infrared intensity value of the receiving end, and determines whether the mobile terminal is approaching the face according to the proximity value. The backlight of the screen can be turned off when the mobile terminal is close to the face to save power. At the same time, for the capacitive touch screen, the output of the driving signal to the touch screen can be stopped to prevent malfunction. In addition, a number of proximity sensors can be used for simple gesture recognition applications. However, due to the linearity of the proximity sensor chip (characteristic curve of the proximity sensor, as shown by the solid lines in FIGS. 3A and 3B), it is technically limited to achieve the ideal state (ideal curve, as shown by the dashed lines in FIGS. 3A and 3B). As such, when the user uses the phone under bright environment, the proximity value becomes smaller as the low noise value becomes larger. That is, as shown in FIGS. 3A and 3B, the proximity value (i.e., PS_ON-PS_OFF) under the influence of the strong solar light is smaller than the proximity value under the influence of the slight ambient light. Moreover, the stronger the ambient infrared intensity, the higher the low noise, and the proximity value will become smaller and smaller. At this time, even if the phone is close to the face, the proximity value is still less than the approaching threshold, leading that the screen could not be turned off. The screen state control method provided by the embodiment of the present disclosure can well solve the above-mentioned problem that, in a bright environment, the screen would not be turned off when the phone is close to the face.

FIG. 4 is a flowchart of a screen state control method according to an embodiment of the present disclosure. The method may be implemented by a screen state control device. The device may be implemented by software and/or hardware, and may be integrated into a mobile terminal. As shown in FIG. 4, the method includes:

Step 410: a ratio of a characteristic curve of a proximity sensor to an ideal curve of the proximity sensor, in each of a number of intervals, is determined, in a bright environment.

In one embodiment, the characteristic curve of the proximity sensor reflects the relationship between the infrared intensity value input to the analog to digital converter and the proximity value of the ADC output. Ideally, the characteristic curve is linear, as shown by the dashed lines in FIGS. 3A and 3B. However, since the linearity of the proximity sensor is limited by the technique, the characteristic curve of the proximity sensor cannot coincide with the ideal curve, and the actual characteristic curve is a solid line as shown in FIGS. 3A and 3B, and as the electric signal (analog amount) corresponding to the infrared rays input to analog-to-digital converter increases, the slope of the characteristic curve of the proximity sensor decreases. Especially in a bright environment, the greater the light intensity value of the ambient infrared light, the greater the low noise value of the proximity sensor. Among them, the bright environment is the working environment of the phone when the light intensity value exceeds a threshold (the threshold may be, for example, 6000 lux).

The interval is used to divide the characteristic curve and the ideal curve of the proximity sensor. The smaller the range of each interval, the higher the accuracy of fitting the ideal curve of the proximity sensor to the ideal curve. In order to determine the ratio between the characteristic curve of the proximity sensor and the ideal curve of the proximity sensor, the infrared rays intensity values are input to the proximity sensor, the infrared rays intensity values are divided into a number of intervals with equal range, then obtaining a number of sub-line segments of the characteristic curve and the sub-line segments of the ideal curve in each intervals. In order to more accurately determine the above ratio relationship, the range can be reduced, then the fitting accuracy will be higher. By comparing the sub-line segments of the characteristic curves in the a number of intervals with the sub-line segments of the ideal curve, the ratio between the ideal curve and the characteristic curve in each of the a number of intervals can be determined. For example, the input infrared rays intensity values are assigned to a number of intervals, for example, at intervals of 500, a number of intervals of 0 to 500, 500 to 1000, ... , 2500 to 3000, 3000 to 3500, 3500 to 4000 are divided thereby. Within each interval, there is a ratio between the sub-line segments of the characteristic curve and the ideal curve. Taking the interval of 2500 to 3000 as an example, by comparing the characteristic curve with the ideal curve, the following ratio relationship can be determined: for the coordinate point where the abscissa of the ideal curve and the characteristic curve are the same, the ordinate of the coordinate point on the characteristic curve*3.5=the ordinate of the coordinate point on the ideal curve.

In an embodiment, when the characteristic curve and the ideal curve of the proximity sensor do not change with the change of the environment, the range of the interval may be pre-defined, for example, every 500 scales form an interval, or every 200 scale forms an interval. The characteristic curve and the ideal curve of the proximity sensor can be divided according to the pre-defined interval, and the ratio of the characteristic curve to the ideal curve in the a number of intervals can be determined. The correspondence between the ratio and the interval is stored for direct query during use.

In an embodiment, different fitting accuracy may be set depending on the usage environment (e.g., the ambient light intensity values). For example, a first fitting accuracy is corresponds to an interval composed by 100 scales, which may be suitable to a first ambient light intensity value range; and a second fitting accuracy is corresponding to an interval composed by 300 scales, which may be applicable to a second ambient light intensity value range; and a third fitting accuracy is corresponding to an interval composed by 500 scales, which may applied in a third ambient light intensity value range. At each fitting accuracy, the characteristic curve and the ideal curve of the proximity sensor may be segmented according to the corresponding intervals of the fitting accuracy, and the ratio of the characteristic curve to the ideal curve in the a number of intervals in each fitting accuracy can be determined. The corresponding relationship between the fitting accuracy, the ratio and the interval is stored. In use, the fitting accuracy may be determined according to the current ambient light intensity value, and then a first interval of the first intensity value is determined, a second interval of the second intensity value is determined, in which the first intensity value is obtained by the receiving end when the transmitting end is turned on, and the second intensity value is obtained by the receiving end when the transmitting end is turned off, thereby determining the ratio of compensating the first intensity value and the ratio of compensating the second intensity value.

If at least one of the characteristic curve and the ideal curve of the proximity sensor changes with the change of the environment, before use, it is necessary to re-align the characteristic curve and the ideal curve of the proximity sensor to determine the ratio of the characteristic curve to the ideal curve, and update the correspondence between the stored interval and the ratio.

Step 420: a first intensity value of a receiving end signal when a transmitting end of the proximity sensor is turned on is obtained, and a second intensity value of a receiving end signal when the transmitting end of the proximity sensor is turned off is obtained, the first intensity value and the second intensity value are respectively compensated according to a ratio corresponding to an interval where the first intensity value belongs to and a ratio corresponding to an interval where the second intensity value belongs to.

One control period includes the sleep time of the infrared LED lamp and the receiving end, the turning on time of the infrared LED lamp, the turning off time of the infrared LED lamp, and the time of collecting infrared rays by the receiving end in non-sleep time thereof. Moreover, during one control period, the sleep time, the turning on time and the turning off time of the infrared LED lamp can be set according to actual needs. In one embodiment, the ratio of sleep time, the turning on time and the turning off time may be 8:1:1.

A pulse signal having a duty ratio is used to control the sleep time, turning on time and turning off time of the infrared LED lamp, and the same pulse signal is also used to control the receiving end to collect infrared rays during the turning on time and the turning off time of the infrared LED lamp. The infrared light collected by the receiving end is processed by the analog-to-digital converter and output to the internal chip processor of the receiving end. In an embodiment, the chip processor of the receiving end turns on the infrared LED lamp of the transmitting end of the proximity sensor at a first preset sampling time, and reads the first intensity value from the receiving end of the proximity sensor. At the same time, the receiving end turns off the transmitting end of the proximity sensor at a second preset sampling time, and reads the second intensity value from the receiving end. According to the ratio of the characteristic curve to the ideal curve in a first setting interval corresponding to the first intensity value, and the ratio of the characteristic curve to the ideal curve in a second setting interval corresponding to the second intensity value, respectively, the first intensity value and the second intensity value are corrected. For example, the internal chip of the receiving end turns on the infrared LED in the transmitting end the first preset sampling time, and reads the first intensity value a from the ADC in the receiving end. The characteristic curve of the proximity sensor is queried to determine a point whose ordinate is a, and the first interval corresponding to the first intensity value a is determined according to the abscissa of the point. If the ratio corresponding to the first interval is b, the ratio b is used to compensate the first intensity value a. That is, the first intensity value after compensation is in the vicinity of the ideal curve by means of a*b. Similarly, the transmitting end of the proximity sensor is turned off at a second preset sampling time, and the second intensity value c is read from the ADC in the receiving end. The characteristic curve of the proximity sensor is determined to determine a point whose ordinate is c, and the second interval corresponding to the second intensity value c is determined according to the abscissa of the point. If the ratio corresponding to the second interval is d, the ratio d is used to compensate the second intensity value c. That is, the compensated second intensity value is in the vicinity of the ideal curve by means of c*d, in which b and d are both natural numbers greater than 1. In this way, it is possible to make up for the defect that the characteristic curve of the proximity sensor cannot reach the state of the ideal curve due to the technical limitation, and it can be considered that the proximity value calculated according to the characteristic curve of the proximity sensor is located near the ideal curve. Therefore, no matter how large the low noise value is, no matter how strong the external ambient light is, the correct reading of the proximity value will not be affected.

Step 430: a corrected proximity value of the proximity sensor is determined according to a compensated first intensity value and a compensated second intensity value, and the screen is controlled, according to a comparison result between the corrected proximity value and a preset threshold, to be selectively in a screen on state or a screen off state.

In an embodiment, the threshold includes a first threshold and a second threshold. For example, a high threshold of the proximity sensor and a low threshold of the proximity sensor. For example, the first threshold may be a minimum value of the indoor proximity value to accumulated the first set parameter, and the second threshold may be a minimum value of the indoor proximity value to accumulate the second set parameter. In an embodiment, the minimum value of the indoor proximity value may be a non-proximity state, and the proximity value obtained in a non-bright environment. Since the proximity value is updated in real time, the minimum value of the indoor proximity value is taken from the minimum value of the real-time updated proximity value. The minimum value, however, sometimes is an abnormally small value due to an abnormality in the proximity sensor chip. At this time, if the abnormally small close value is taken as the minimum value of the indoor proximity value, the threshold would not be in line with the actual situation. Therefore, it is possible to acquire five consecutive proximity values updated in real time over a period of time, and take an average of the five consecutive proximity values. Then, the minimum mean of these average values is taken as the minimum value of the true indoor proximity value. For example, within 10 minutes, the indoor proximity value is continuously acquired 5 times per minute in a cycle of 1 minute. The average values of the five indoor proximity values in each minute are calculated, and the average values of the five indoor proximity values in the 10 minutes are compared, and the minimum average value of the 10 indoor proximity values in the 10 minutes was determined as a reference proximity value.

The first intensity value is multiplied by the ratio corresponding to the ratio of the first interval corresponding to the first intensity value (i.e., a*b), and the second intensity value is multiplied by the ratio of the second interval corresponding to the second intensity value (i.e., c*d). The results of the two multiplications are subtracted to obtain the corrected proximity value. Since the first intensity value corresponding to the infrared LED light on state is greater than the second intensity value corresponding to the infrared LED light off state, and both b and d are natural numbers greater than 1, the corrected proximity value ps=a*b-c*d is a positive number.

When the mobile terminal is in a screen on state, the corrected proximity value is compared with the first threshold. If the corrected proximity value is greater than the first threshold, an interrupt signal is output to control the screen off. When the mobile terminal is in a screen off state, the corrected proximity value is compared with the second threshold. If the corrected proximity value is less than the second threshold, an interrupt signal is output to control the screen on.

The embodiment eliminates the interference of ambient light, avoids the problem that the backlight of the screen will not be turned off when the screen being close to a face under bright environment, and realizes a desirable function of screen off and screen on.

Before determining the ratio of the characteristic curve of the proximity sensor to the ideal curve in the a number of intervals, the embodiment of the present disclosure may further include: a light intensity value of the current ambient light is acquired; and whether the light intensity value exceeds a light intensity threshold is determined, if the light intensity value exceeds the light intensity threshold, determining a ratio of the characteristic curve of the proximity sensor to the ideal curve in the multiple intervals; if the light intensity value is not exceeding the light intensity threshold, acquiring the first intensity value of the receiving end signal corresponding to the transmitting end in an open state, and the second intensity value of the receiving end signal corresponding to the transmitting end in a closed state. For example, the light intensity threshold is set to 6000 lux. The light intensity value of the current ambient light is compared with 6000 lux; if the light intensity value is greater than 6000 lux, an operation of obtaining a ratio relationship between the characteristic curve and the ideal curve is performed. If the light intensity value is less than or equal to 6000 lux, the operation of acquiring the ratio relationship between the two curves is not performed. The advantage of this setting is firstly to determine the environment in which the mobile terminal belongs, and use the ratio in the bright environment to compensate the first intensity value and the second intensity value, thus avoiding the problem that the screen will not off when the screen approaches to a face under bright environment. While in a non-bright-light environment, the compensation operation is omitted, and the method is simplified.

Figure 5A:
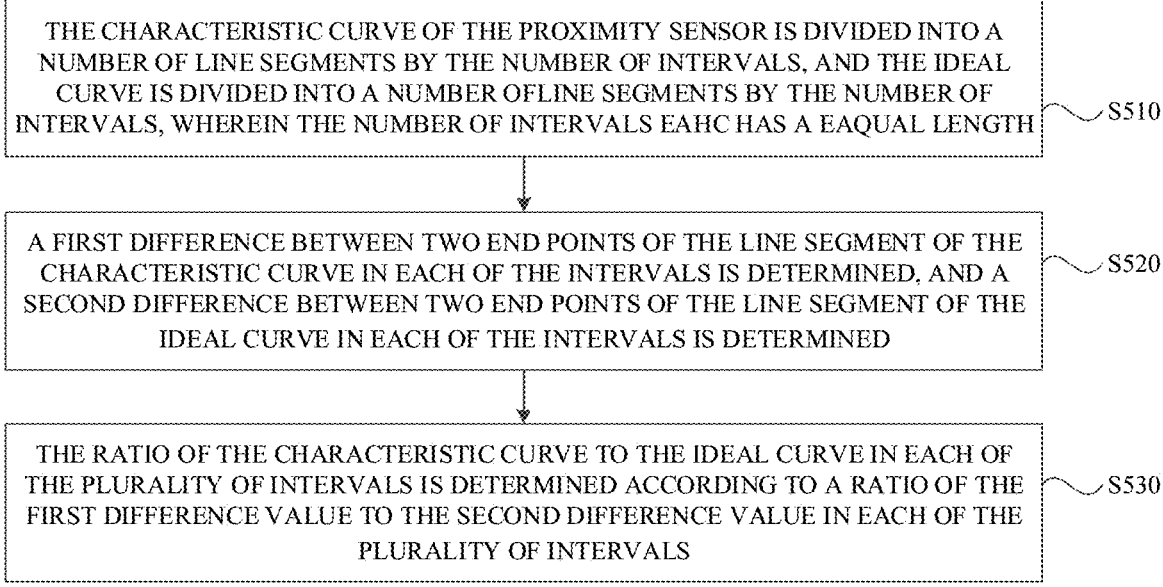
FIG. 5A illustrates a flowchart of a method for determining a ratio of a characteristic curve of an proximity sensor to an ideal curve of the proximity sensor according to an embodiment of the present disclosure.

FIG. 5A is a flowchart of a method for determining a ratio of a proximity sensor characteristic curve to an ideal curve according to an embodiment of the present disclosure. As shown in FIG. 5A, the method includes:

Step 510: The characteristic curve of the proximity sensor is divided into a number of line segments by the number of intervals, and the ideal curve is divided into a number of line segments by the number of intervals, wherein the number of intervals each has an equal length.

Figure 5B:
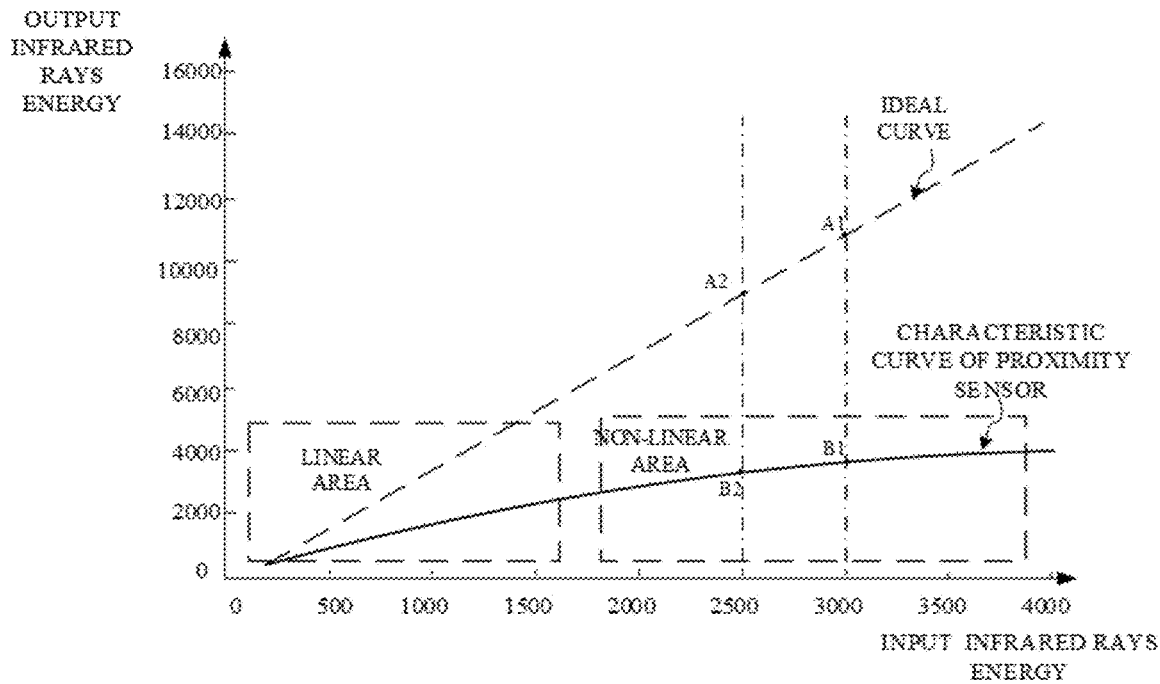
FIG. 5B illustrates a schematic diagram of a method for calculating a ratio of a characteristic curve of an proximity sensor to an ideal curve according to an embodiment of the present disclosure.

FIG. 5B shows a schematic diagram of a method of calculating the ratio of the characteristic curve of the proximity sensor to the ideal curve. As shown in FIG. 5B, the interval is set at a scale of 500, and an interval of 0 to 4000 is divided into 8 intervals, and there is a line segment of the characteristic curve and a line segment of the ideal curve in each of the intervals. The line segment of the characteristic curve of the proximity sensor in each of the intervals (i.e., the sun-line segment of the characteristic curve of the proximity sensor in each of the intervals) and the line segment of the ideal curve in each of the intervals (i.e., the line segment of the ideal curve in each of the intervals) have a certain ratio relationship.

Step 520: A first difference between two end points of the line segment of the characteristic curve in each of the intervals is determined, and a second difference between two end points of the line segment of the ideal curve in each of the intervals is determined.

As shown in FIG. 5B, the end points of the line segments of the characteristic curve in each of the intervals is determined. The end points of the line segments of the ideal curve in each interval is determined. Taking the 2500-3000 interval as an example. The characteristic curves and the ideal curves of the proximity sensor are respectively queried. Four points with the abscissa of 2500 and 3000 are determined as the endpoints of the characteristic curve and the ideal curve within the range of 2500-3000. For example, in the interval, the endpoints of the characteristic curve are A1 and A2; and, the endpoints of the ideal curve are B1 and B2. The absolute value of the difference between the ordinate values of A1 and A2 is taken as the first difference. The absolute value of the difference between the ordinates of B1 and B2 is taken as the second difference. In the same manner, the difference between the two endpoints of the line segment of the characteristic curve in the remaining interval can be calculated, and the difference between the two endpoints of the line segment of the ideal curve in the remaining interval is calculated.

Step 530: the ratio of the characteristic curve to the ideal curve in each of the plurality of intervals is determined according to a ratio of the first difference value to the second difference value in each of the plurality of intervals.

The ratio of the characteristic curve to the ideal curve in each of the intervals is calculated by dividing the first difference value in each interval by the second difference value. For example, in the 2500-3000 interval, the ratio of the characteristic curve to the ideal curve is 1:3.5, that is, for the coordinate point where the abscissa of the ideal curve is the same as the characteristic curve, the ordinate of the coordinate point of the characteristic curve*3.5=the ordinate of the coordinate point of the ideal curve.

In the embodiment, the characteristic curve and the ideal curve of the proximity sensor are respectively divided into a plurality of line segments by setting the equally spaced intervals; a first difference value between two end points of the line segment of the characteristic curve in each of the intervals is determined, and a second difference value between two end points of the line segment of the ideal curve in each of the intervals is determined; according to the first difference value and the second difference value in each interval, the ratio of the characteristic curve of the proximity sensor to the ideal curve in each interval is determined, and the first intensity value and second intensity value are respectively compensated according to the ratio. The embodiment can realize that the compensated first intensity value and the compensated second intensity value substantially coincide with the ideal curve. No matter how large the low noise value is, and no matter how strong the infrared light interference of the external environment is, the proximity value will not be affected, thus realizing normal screen off and screen on function.

FIG. 6A is a flow chart of another method for determining a ratio of a characteristic curve to an ideal curve according to an embodiment of the present disclosure. As shown in FIG. 6A, the method includes:

Step 610: The characteristic curve of the proximity sensor is divided into a number of first line segments by the number of intervals, and the ideal curve is divided into a number of second line segments by the number of intervals, wherein the number of intervals each has an equal length.

FIG. 6B shows a schematic diagram of another method of calculating the ratio of the characteristic curve to the ideal curve. As shown in FIG. 6B, the interval is set at a scale of 500, and an interval of 0 to 4000 is divided into 8 intervals. The first line segment of the characteristic curve of the proximity sensor in each of the intervals and the second line segment of the ideal curve in each of the intervals have a certain ratio relationship.

Step 620: in each of the number of intervals, a first pattern is formed by the first line segment of the characteristic curve and the orthographic projection of the first line segment of the characteristic curve on the abscissa axis.

A first line segment of the characteristic curve in each interval is determined. The orthographic projection of the first line segment of the proximity sensor characteristic curve is obtained on the abscissa axis to obtain a projection line segment of the first line segment. The endpoints of the first line segment and the endpoints of the projection line segment are connected in the same interval to constitute a first pattern. As shown in FIG. 6B, taking the interval of 2500-3000 as an example. It can be determined that the endpoints of the first line segment of the characteristic curve are B1 and B2 in the interval. The orthographic projection of the abscissa axis of the first line segment with B1 and B2 is a projection line segment with C1 and C2 as the endpoints thereof. The projection line segment is the projection line segment of the first line segment of the characteristic curve in the interval of 2500-3000. The endpoints of B1, B2, C2, C1, and B1 are sequentially connected to form the first pattern.

Step 630: in each of the intervals, a second pattern is obtained by the second line segment of the ideal curve and the orthographic projection of the second line segment of the ideal curve on the abscissa axis.

A second line segment of the ideal curve in each interval is determined. The orthographic projection of the second line segment of the proximity sensor ideal curve is obtained on the abscissa axis to obtain a projection line segment of the second line segment. The endpoints of the second line segment and the endpoints of the projection line segment are connected in the same interval to constitute a second pattern. As shown in FIG. 6B, taking the interval of 2500-3000 as an example. It can be determined that the endpoints of the second line segment of the ideal curve are A1 and A2 in the interval. The orthographic projection of the abscissa axis of the second line segment with A1 and A2 is a projection line segment with C1 and C2 as the endpoints thereof. The projection line segment is the projection line segment of the second line segment of the ideal curve in the interval of 2500-3000. The endpoints of A1, A2, C2, C1, and A1 are sequentially connected to form the second pattern.

Step 640: the ratio of the characteristic curve to the ideal curve in each of the intervals is determined according to an area ratio of the first pattern to the second pattern in each of the intervals.

Taking the interval of 2500-3000 as an example. As shown in FIG. 6B, the second pattern is a right-angled trapezoid, and the area of the second pattern can be calculated according to the area calculation formula of the rectangular trapezoid. The area of the first pattern can be calculated by integrating. The ratio of the characteristic curve to the ideal curve in the interval of 2500 to 3000 is obtained by dividing the area of the first pattern by the area of the second pattern.

In the embodiment, by setting equal intervals, the characteristic curve of the proximity sensor is divided into a plurality of first line segments and the ideal curve is divided into a plurality of second line segments respectively by the interval; in each of the intervals, a first pattern is obtained by the first line segment of the characteristic curve and the orthographic projection of the first line segment of the characteristic curve on the abscissa axis, a second pattern is obtained by the second line segment of the ideal curve and the orthographic projection of the second line segment of the ideal curve on the abscissa axis, a ratio of the characteristic curve to the ideal curve in each of the intervals is determined according to an area ratio of the first pattern to the second pattern in each of the intervals, and the first intensity value and the second intensity value are compensated according to the ratio. The embodiment can realize that the compensated first intensity value and the compensated second intensity value substantially coincide with the ideal curve. No matter how large the low noise value is, and no matter how strong the infrared light interference of the external environment is, the proximity value will not be affected, thus achieving normal screen off and screen on function.

Figure 7:
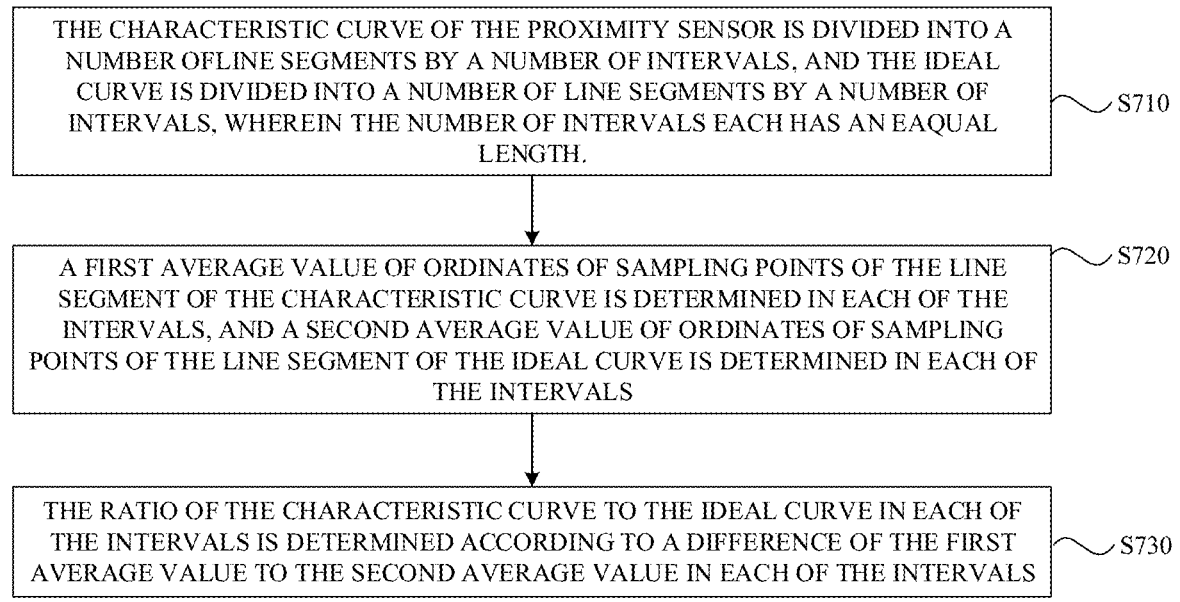
FIG. 7 illustrates a flowchart of a method for determining a ratio of a characteristic curve of an proximity sensor to an ideal curve according to another embodiment of the present disclosure.

FIG. 7 is a flow chart of still another method for determining a ratio of a characteristic curve of an proximity sensor to an ideal curve according to an embodiment of the present disclosure. As shown in FIG. 7, the method includes:

Step 710: The characteristic curve of the proximity sensor is divided into a number of line segments by a number of intervals, and the ideal curve is divided into a number of line segments by a number of intervals, wherein the number of intervals each has an equal length.

As shown in FIG. 5B, the interval is set at a scale of 500, and interval of 0 to 4000 are divided into 8 intervals. The line segment of the characteristic curve of the proximity sensor in each of the intervals and the line segment of the ideal curve in each of the intervals have a certain ratio relationship.

Step 720: a first average value of ordinates of sampling points of the line segment of the characteristic curve is determined in each of the intervals, and a second average value of ordinates of sampling points of the line segment of the ideal curve is determined in each of the intervals.

Sampling is performed at each interval in accordance with a preset abscissa axis interval. For example, taking the 2500-3000 interval as an example. If the abscissa axis interval is set as 50, there are 10 sampling points in the line segment of characteristic curve in the 2500-3000 interval, and the abscissas of the 10 sampling points are respectively being 2550, 2600, . . . , 2950, and 3000. Then the average of the ordinate values of the 10 sample points is calculated as the first average value. Similarly, there are 10 sampling points in the line segment of the ideal curve in the 2500-3000 interval, and the abscissas of the 10 sampling points are 2550, 2600, . . . , 2950 and 3000, respectively. Then the average of ordinate values of the 10 sampling points is calculated as the second average value.

Step 730: the ratio of the characteristic curve to the ideal curve in each of the intervals is determined according to a difference of the first average value to the second average value in each of the intervals.

In the embodiment, by setting equal intervals, the characteristic curve of the proximity sensor is divided into a plurality of first line segments and the ideal curve is divided into a plurality of second line segments respectively by the interval; a first average value of ordinates of sampling points of the line segment of the characteristic curve is determined in each of the intervals, and a second average value of ordinates of sampling points of the line segment of the ideal curve is determined in each of the intervals; a ratio of the characteristic curve to the ideal curve in each of the intervals is determined according to a difference of the first average value to the second average value in each of the intervals, and the first intensity value and the second intensity value are compensated according to the ratio. The embodiment can realize that the compensated first intensity value and the compensated second intensity value substantially coincide with the ideal curve. No matter how large the low noise value is, and no matter how strong the infrared light interference of the external environment is, the proximity value will not be affected, thus achieving normal screen off and screen on function.

Figure 8:
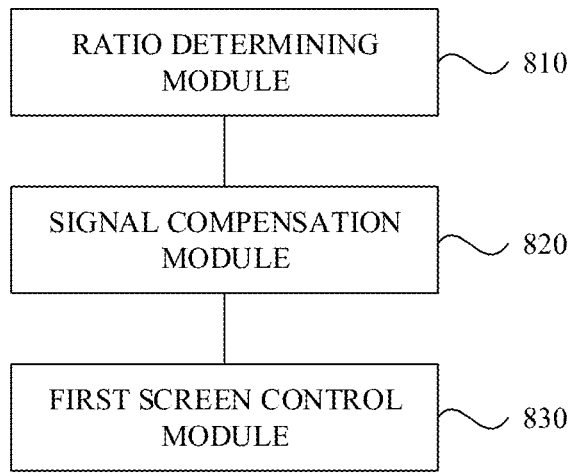
FIG. 8 illustrates a schematic structural diagram of a screen state control apparatus according to an embodiment of the present disclosure.

FIG. 8 is a schematic structural diagram of a screen state control device according to an embodiment of the present disclosure. The device can be implemented by software and/or hardware and is generally integrated in a mobile terminal. As shown in FIG. 8, the device may include:

A ratio determining module 810, configured to determine, in a bright environment, a ratio of a characteristic curve of a proximity sensor to an ideal curve of the proximity sensor in each of a number of intervals;

A signal compensation module 820, configured to obtain a first intensity value of a receiving end signal when the transmitting end of the proximity sensor is turned on, and a second intensity value of a receiving end signal when the transmitting end of the proximity sensor is turned off, and to compensate the first intensity value and the second intensity value respectively according to a ratio corresponding to an interval where the first intensity value belongs to and a ratio corresponding to an interval where the second intensity value belongs to.

A first screen control module 830, configured to determine a corrected proximity value of the proximity sensor according to a compensated first intensity value and a compensated second intensity value, and to control the screen, according to a comparison result between the corrected proximity value and a preset threshold, to be selectively in a screen on state or a screen off state.

The embodiment provides a screen state control device compensates the first intensity value and the second intensity value by the ratio of the characteristic curve to the ideal curve, in which the first intensity is obtained by the receiving end corresponding to an opening state of the transmitting end of the proximity sensor, the second intensity is obtained by the receiving end corresponding to a closed state of the transmitting end, thus the interference of the ambient light is eliminated, the problem that the backlight of the screen will not be turned off when the screen being close to a face under bright environment is avoided, the normal screen on and screen off function is realized.

Figure 9:
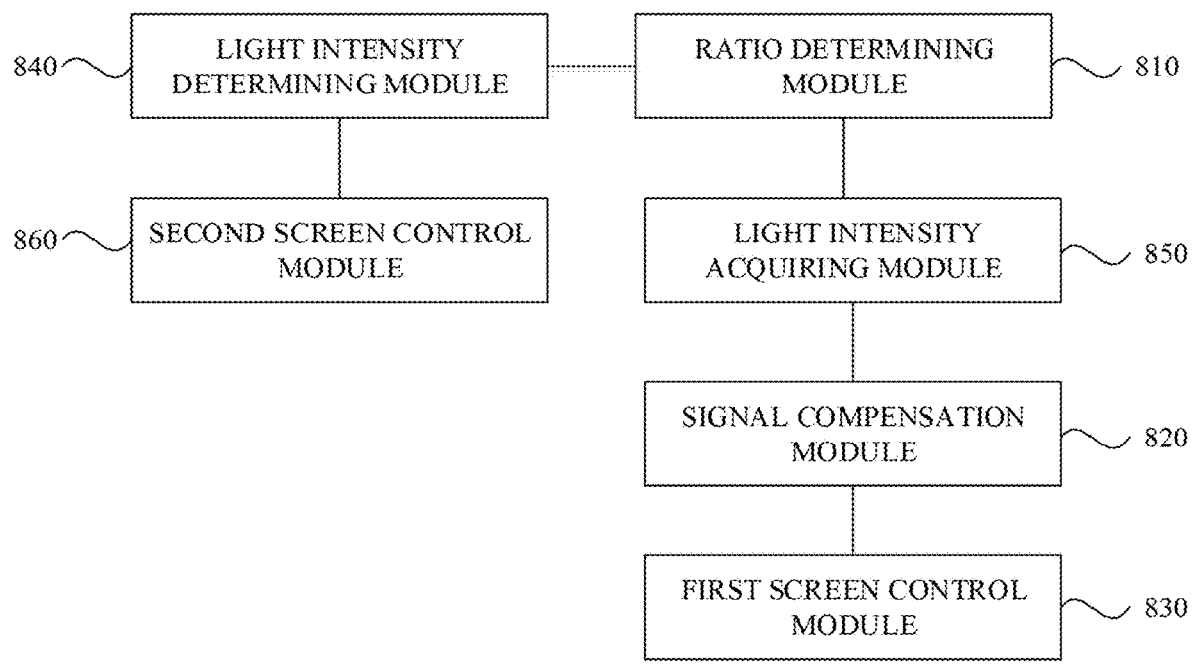
FIG. 9 illustrates a schematic structural diagram of a screen state control apparatus according to another embodiment of the present disclosure.

FIG. 9 is a schematic structural diagram of a screen state control device according to an embodiment of the present disclosure. In an embodiment, as shown in FIG. 9, the device further includes:

A light intensity determining module 840, configured to, before the ratio determining module determining the ratio of the characteristic curve of the proximity sensor to the ideal curve in each of the number of intervals, acquire a light intensity value of the current ambient light; and determine whether the light intensity value exceeds a light intensity threshold;

And determine the mobile terminal is in the bright environment when the light intensity value exceeds the light intensity threshold.

In an embodiment, the ratio determination module 810 is configured to:

Divide the characteristic curve of the proximity sensor into a plurality of line segments by the plurality of intervals, and divide the ideal curve of the proximity sensor into a plurality of line segments by the plurality of intervals, wherein the plurality of intervals each has an equal length;

Determine a first difference between two endpoints of the each of the number of line segments of the characteristic curve in each of the number of intervals, and a second difference between two end points of the number of line segments of the ideal curve in each of the number of intervals, respectively;

Determine the ratio of the characteristic curve to the ideal curve in each of the plurality of intervals according to a ratio of the first difference value to the second difference value in each of the plurality of intervals.

In an embodiment, the ratio determination module 810 is configured to:

Divide the characteristic curve of the proximity sensor into a plurality of first line segments by the plurality of intervals, and divide the ideal curve of the proximity sensor into a plurality of second line segments by the plurality of intervals, wherein the plurality of intervals each has an equal length;

Obtain first patterns formed by each of the first line segments of the characteristic curve and an orthographic projection of each of the first line segments of the characteristic curve on the abscissa axis;

Obtain second patterns formed by each of the second line segments of the ideal curve and an orthographic projection of each of the second line segments of the ideal curve on the abscissa axis;

And determine the ratio of the characteristic curve to the ideal curve in each of the plurality of the intervals according to an area ratio of the first pattern to the second pattern in each of the plurality of intervals.

In an embodiment, the ratio determination module 810 is configured to:

Divide the characteristic curve of the proximity sensor into a plurality of line segments by the plurality of intervals, and divide the ideal curve of the proximity sensor into a plurality of line segments by the plurality of intervals, wherein the plurality of intervals each has an equal length;

Determine a first average value of ordinates of sampling points of the line segment of the characteristic curve and a second average value of ordinates of sampling points of the line segment of the ideal curve in each of the intervals;

And determine the ratio of the characteristic curve to the ideal curve in each of the number of intervals according to a difference of the first average value to the second average value in each of the number of intervals.

In an embodiment, the signal compensation module 820 is configured to:

Turn on the transmitting end of the proximity sensor at a first preset sampling time, and obtain the first intensity value from the receiving end of the proximity sensor;

Turn off the transmitting end of the proximity sensor at a second preset sampling time, and obtain a second intensity value from the receiving end of the proximity sensor;

And correct the first intensity value and the second intensity value according to the ratio of the characteristic curve to the ideal curve in a first setting interval corresponding to the first intensity value, and the ratio of the characteristic curve to the ideal curve in a second setting interval corresponding to the second intensity value.

In an embodiment, the first screen control module 830 is configured to:

Determine a difference of the compensated first intensity value and the compensated second intensity value as the compensated second intensity value;

Control the screen off when the corrected proximity value is greater than the first threshold;

Control the screen on when the corrected proximity value is less than the second threshold.

In an embodiment, the ratio determining module 810 is configured to set different fitting accuracy according to different ambient light intensity value, and determine the ratio of the characteristic curve to the ideal curve in the a number of intervals in each fitting accuracy.

The device further includes a light intensity acquiring module 850, configured to acquire a light intensity value of the current ambient light, and determine a target fitting accuracy corresponding to the ambient light intensity value range in which the light intensity value is obtained;

The signal compensation module 820 is configured to acquire a first intensity value of the receiving end when the transmitting end is turned on, and a second intensity value of the receiving end signal when the transmitting end is turned off, and compensate the first intensity value and the second intensity value according to the ratio of the characteristic curve to the ideal curve in the corresponding target fitting accuracy.

In an embodiment, the device further includes:

A second screen control module 860, configured to, when the light intensity value fails to exceed the light intensity threshold, acquire the first intensity value and the second intensity value, use the difference of the first intensity value and control the screen selectively in the screen on stated and the screen off state, according to a comparison result of the corrected proximity value and the preset threshold.

The embodiment of the present disclosure further provides a storage medium including computer executable instructions for executing a screen state control method when executed by a computer processor, the method comprising:

Determining, in a bright environment, a ratio of a characteristic curve of a proximity sensor to an ideal curve of the proximity sensor in each of a plurality of intervals;

Obtaining a first intensity value of a receiving end signal when a transmitting end of the proximity sensor is turned on, and a second intensity value of a receiving end signal when the transmitting end of the proximity sensor is turned off, and respectively compensating the first intensity value and the second intensity value respectively according to the ratio; and Determining a corrected proximity value of the proximity sensor according to a compensated first intensity value and a compensated second intensity value, and controlling the screen, according to a comparison result between the corrected proximity value and a preset threshold, to be selectively in a screen on state and a screen off state.

A Storage medium—any one or more types of memory devices or storage devices. The term "storage medium" is intended to include: a mounting medium such as a Compact Disc Read-Only Memory (CD-ROM), a floppy disk or a tape device; a computer system memory or a random access memory such as a dynamic Random Access Memory (DRAM), Double Data Rate Random Access Memory (DDR RAM), Static Random Access Memory (SRAM), Extended Data Output Random Access Memory (EDO RAM) and Rambus RAM, etc.; non-volatile memory such as flash memory, magnetic media (such as hard disk or optical storage); registers or other similar types of memory components, etc. The storage medium may also include other types of memory or a combination thereof. Additionally, the storage medium may be located in a first computer system in which the program is executed, or may be located in a different second computer system, the second computer system being coupled to the first computer system via a network, such as the Internet. The second computer system can provide program instructions to the first computer for execution. The term "storage medium" can include two or more storage media that can reside in different locations (e.g., in different computer systems connected through a network). A storage medium may store program instructions (e.g., embodied as a computer program) executable by one or more processors.

Figure 10:
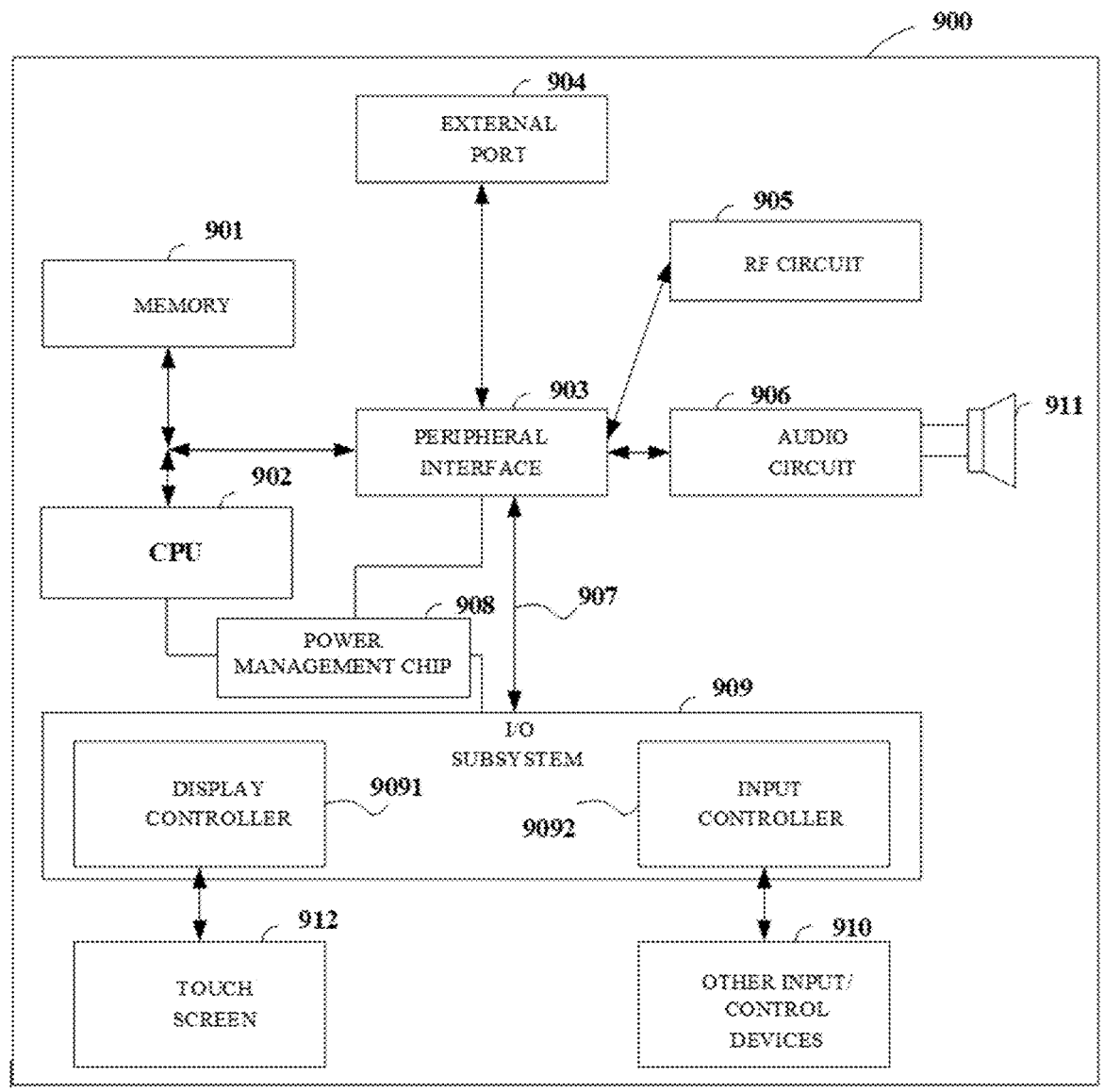
FIG. 10 illustrates a schematic structural diagram of a mobile terminal according to an embodiment of the present disclosure.

Of course, the storage medium containing the computer executable instructions provided by the embodiment of the present disclosure is not limited to the response operation of the screen state control as described above, and may also perform the screen state provided by any embodiment of the present disclosure. Related operations are disclosed in the control method. The embodiment of the present disclosure provides a mobile terminal, where the screen state control device provided by the embodiment of the present disclosure can be integrated. FIG. 10 is a schematic structural diagram of a mobile terminal according to an embodiment of the present disclosure. As shown in FIG. 10, the mobile terminal may include: a casing (not shown), a touch screen (not shown), a touch button (not shown), a memory 901, and a central processing unit (Central Processing). Unit, CPU) 902 (also referred to as a processor, hereinafter referred to as CPU), a circuit board (not shown), and a power supply circuit (not shown). The circuit board is disposed inside a space enclosed by the casing; the CPU 902 and the memory 901 are disposed on the circuit board; the power circuit is configured as one or more circuits of the electronic device or the device is powered; the memory 901 is configured to store executable program code; the CPU 902 runs a computer program corresponding to the executable program code by reading executable program code stored in the memory 901 to implement the following step:

Determining, in a bright environment, a ratio of a characteristic curve of a proximity sensor to an ideal curve of the proximity sensor in each of a plurality of intervals;

Obtaining a first intensity value of a receiving end signal when a transmitting end of the proximity sensor is turned on, and a second intensity value of a receiving end signal when the transmitting end of the proximity sensor is turned off, and respectively compensating the first intensity value and the second intensity value respectively according to the ratio; and Determining a corrected proximity value of the proximity sensor according to a compensated first intensity value and a compensated second intensity value, and controlling the screen, according to a comparison result between the corrected proximity value and a preset threshold, to be selectively in a screen on state and a screen off state.

The mobile terminal further includes: a peripheral interface 903, a radio frequency (RF) circuit 905, an audio circuit 906, a speaker 911, a power management chip 908, and an input/output (I/O) subsystem 909, a touch screen 912, other input/control devices 910, and external port 904 are communicated via one or more communication buses or signal lines 907.

The mobile terminal 900 is merely one example of a mobile phone, and the mobile terminal 900 may have more or fewer components than those shown in the figures, two or more components may be combined, or may have different component configuration. The various components shown in the figures can be implemented in hardware, software, or a combination of hardware and software, including one or more signal processing and/or application specific integrated circuits.

The mobile terminal for screen state control provided by this embodiment is described in detail below. The mobile terminal takes a mobile phone as an example.

The memory 901 can be accessed by the CPU 902 and the peripheral interface 903, etc., and the memory 901 can include a high speed random access memory, and can also include a nonvolatile memory, such as one or more magnetic disk storage devices, flash memory devices. Or other volatile solid-state storage devices.

A peripheral interface 903 that can connect the input and output peripherals of the device to the CPU 902 and the memory 901.

The I/O subsystem 909, which can connect input peripherals and output peripherals on the device, such as touch screen 912 and other input/control devices 910, to peripheral interface 903. The I/O subsystem 909 can include a display controller 9091 and one or more input controllers 9092 that are configured to control other input/control devices 910. Wherein, one or more input controllers 9092 receive electrical signals from other input/control devices 910 or transmit electrical signals to other input/control devices 910, and other input/control devices 910 may include physical buttons (pressing buttons or rocker buttons, etc.)), dial, slide switch, joystick, click wheel. In an embodiment, the input controller 9092 can be connected to any of the following: a keyboard, an infrared port, a USB interface, and a pointing device such as a mouse.

The touch screen 912 is an input interface and an output interface between the user electronic device and the user, and displays the visual output to the user. The visual output may include graphics, text, icons, videos, and the like.

The display controller 9091 in I/O subsystem 909 receives an electrical signal from touch screen 912 or an electrical signal to touch screen 912. The touch screen 912 detects the contact on the touch screen 912, and the display controller 9091 converts the detected contact into an interaction with the user interface object displayed on the touch screen 912, that is, realizes human-computer interaction, and the user interface object displayed on the touch screen 912 may be icons for running games, for connecting to the corresponding network, and so on. In an embodiment, the device may also include a light mouse, which has a touch sensitive surface that does not display a visual output, or an extension of a touch sensitive surface formed by the touch screen.

The RF circuit 905 is configured to establish communication between the mobile terminal and the wireless network (i.e., the network side) to implement data reception and transmission between the mobile terminal and the wireless network. For example, sending and receiving short messages, emails, and the like. In one embodiment, the RF circuit 905 receives and transmits an RF signal, also referred to as an electromagnetic signal, and the RF circuit 905 converts the electrical signal into an electromagnetic signal or converts the electromagnetic signal into an electrical signal, and communicate with network or other devices through the electromagnetic signal. The RF circuitry 905 may include known circuitry configured to perform these functions, including but not limited to antenna systems, the RF transceivers, one or more amplifiers, tuners, one or more oscillators, digital signal processors, Coder-Decoder (CODEC) chipset, Subscriber Identity Module (SIM), etc.

The audio circuit 906 is arranged to receive audio data from the peripheral interface 903, convert the audio data into an electrical signal, and transmit the electrical signal to the speaker 911.

The speaker 911 is arranged to restore the voice signal received by the mobile terminal from the wireless network through the RF circuit 905 to sound and play the sound to the user.

The power management chip 908 is configured to provide power and power management for the hardware connected to the CPU 902, the I/O subsystem, and the peripheral interface.

The mobile terminal provided by the embodiment of the present disclosure can effectively prevent a situation in which a face or a human ear is close to the screen in a bright environment, and the backlight of the screen would not be turned off.

The screen state control device, the storage medium, and the mobile terminal provided in the foregoing embodiments may perform the screen state control method provided by any embodiment of the present disclosure, and have corresponding functional modules and beneficial effects for performing the method. For a technical detail that is not described in detail in the above embodiments, reference may be made to the screen state control method provided by any embodiment of the present disclosure.

Note that the above are only the embodiments of the present disclosure and the technical principles applied thereto.

What is claimed is:
1. A screen state control method comprising:
   determining a ratio of a characteristic curve of a proximity sensor to an ideal curve of the proximity sensor in each of a plurality of intervals;
   obtaining a first intensity value of a receiving end signal when a transmitting end of the proximity sensor is turned on, obtaining a second intensity value of a receiving end signal when the transmitting end of the proximity sensor is turned off, and compensating the first intensity value and the second intensity value respectively according to a ratio corresponding to an interval where the first intensity value belongs to and a ratio corresponding to an interval where the second intensity value belongs to; and
   determining a corrected proximity value of the proximity sensor according to a compensated first intensity value and a compensated second intensity value, and controlling the screen, according to a comparison result between the corrected proximity value and a preset threshold, to be selectively in a screen on state or a screen off state;

wherein the determining a ratio of a characteristic curve of a proximity sensor to an ideal curve of the proximity sensor in each of a plurality of intervals comprises:
  setting different fitting accuracy according to different ambient light intensity value, and determining the ratio of the characteristic curve to the ideal curve in the plurality of intervals, corresponding to each fitting accuracy;
wherein before the obtaining a first intensity value of a receiving end signal corresponding to a turning on state of the transmitting end of the proximity sensor and a second intensity value of a receiving end signal corresponding to a turning off state of the transmitting end of the proximity sensor, the method further comprises:
  acquiring a light intensity value of a current ambient light, and determining a target fitting accuracy corresponding to an ambient light intensity value range to which the light intensity value belongs;
wherein the compensating the first intensity value and the second intensity value respectively according to the ratio, comprises:
  compensating the first intensity value and the second intensity value according to the ratio of the characteristic curve to the ideal curve in the corresponding target fitting accuracy.

2. The method according to claim 1, wherein before determining the ratio of the characteristic curve of the proximity sensor to the ideal curve of the proximity sensor in each of the plurality of intervals, the method further comprises:
  acquiring a light intensity value of the current ambient light, and determining whether the light intensity value exceeds a light intensity threshold; and
  determining a mobile terminal being in a bright environment when the light intensity value exceeds the light intensity threshold.

3. The method according to claim 1, wherein determining a ratio of the characteristic curve of the proximity sensor to an ideal curve of the proximity sensor in each of the plurality of intervals comprises:
  dividing the characteristic curve of the proximity sensor into a plurality of line segments by the plurality of intervals, and dividing the ideal curve of the proximity sensor into a plurality of line segments by the plurality of intervals, wherein the plurality of intervals each has an equal length;
  determining a first difference between two endpoints of each of the plurality of line segments of the characteristic curve, and a second difference between two end points of the plurality of line segments of the ideal curve, respectively; and
  determining the ratio of the characteristic curve to the ideal curve in each of the plurality of the intervals, according to a ratio of the first difference value to the second difference value in each of the plurality of the intervals.

4. The method according to claim 1, wherein determining a ratio of a characteristic curve of the proximity sensor to an ideal curve in each of a plurality of intervals comprises:
  dividing the characteristic curve of the proximity sensor into a plurality of first line segments by the plurality of intervals, and dividing the ideal curve of the proximity sensor into a plurality of second line segments by the plurality of intervals, wherein the plurality of intervals each has an equal length;
  obtaining first patterns formed by each of the first line segments of the characteristic curve and an orthographic projection of each of the first line segments of the characteristic curve on the abscissa axis;
  obtaining second patterns formed by each of the second line segments of the ideal curve and an orthographic projection of each of the second line segments of the ideal curve on the abscissa axis; and
  determining the ratio of the characteristic curve to the ideal curve in each of the plurality of the intervals according to an area ratio of the first pattern to the second pattern in each of the plurality of the intervals.

5. The method according to claim 1, wherein determining a ratio of a characteristic curve of the proximity sensor to an ideal curve in each of a plurality of intervals comprises:
  dividing the characteristic curve of the proximity sensor into a plurality of line segments by the plurality of intervals, and dividing the ideal curve of the proximity sensor into a plurality of line segments by the plurality of intervals, wherein the plurality of intervals each has an equal length;
  determining a first average value of ordinates of sampling points of the line segment of the characteristic curve and a second average value of ordinates of sampling points of the line segment of the ideal curve in each of the intervals; and
  determining the ratio of the characteristic curve to the ideal curve in each of the plurality of intervals according to a difference of the first average value to the second average value in each of the plurality of intervals.

6. The method according to claim 1, wherein obtaining a first intensity value of a receiving end signal corresponding to a turning on state of the transmitting end of the proximity sensor and a second intensity value of a receiving end signal corresponding to a turning off state of the transmitting end of the proximity sensor, and to compensate the first intensity value and the second intensity value respectively according to the ratio, comprising:
  turning on the transmitting end of the proximity sensor at a first preset sampling time, and obtaining a first intensity value from the receiving end of the proximity sensor;
  turning off the transmitting end of the proximity sensor at a second preset sampling time, and obtaining a second intensity value from the receiving end of the proximity sensor; and
  correcting the first intensity value and the second intensity value according to the ratio of the characteristic curve to the ideal curve in a first setting interval corresponding to the first intensity value and the ratio of the characteristic curve to the ideal curve in a second setting interval corresponding to the second intensity value.

7. The method according to claim 1, wherein determining a corrected proximity value of the proximity sensor according to a compensated first intensity value and a compensated second intensity value, and controlling the screen, according to a comparison result between the corrected proximity value and a preset threshold, to be selectively in a screen on state or a screen off state, comprising:
  determining a difference of the compensated first intensity value and the compensated second intensity value as the corrected proximity value of the proximity sensor;
  controlling the screen off when the corrected proximity value is greater than the first threshold; and
  controlling the screen on when the corrected proximity value is less than the second threshold.

8. The method according to claim 2, further comprising:
when the light intensity value fails to exceed the light intensity threshold, acquiring the first intensity value and the second intensity value, using the difference of the first intensity value and the second intensity value as a corrected proximity value of the proximity sensor, and controlling the screen selectively in the screen on state and the screen off state, according to a comparison result of the corrected proximity value and the preset threshold.

9. A screen state control device, comprising:
a ratio determining module configured to determine a ratio of a characteristic curve of a proximity sensor to an ideal curve of the proximity sensor in each of a plurality of intervals, wherein the characteristic curve of the proximity sensor reflects a relationship between an infrared intensity value input to an analog to digital converter and a proximity value of the analog to digital converter output;
a signal compensation module configured to obtain a first intensity value of a receiving end signal when a transmitting end of the proximity sensor is turned on, and obtain a second intensity value of a receiving end signal when the transmitting end of the proximity sensor is turned off, and to compensate the first intensity value and the second intensity value respectively according to a ratio corresponding to an interval where the first intensity value belongs to and a ratio corresponding to an interval where the second intensity value belongs to; and
a first screen control module configured to determine a corrected proximity value of the proximity sensor according to a compensated first intensity value and a compensated second intensity value, and to control the state of backlight of the screen, according to a comparison result between the corrected proximity value and a preset threshold;
wherein the ratio determining module is configured to:
divide the characteristic curve of the proximity sensor into a plurality of line segments by the plurality of intervals, and divide the ideal curve of the proximity sensor into a plurality of line segments by the plurality of intervals, wherein the plurality of intervals each has an equal length;
determine a first difference between two endpoints of each of the plurality of line segments of the characteristic curve, and a second difference between two end points of the plurality of line segments of the ideal curve, respectively; and
determine the ratio of the characteristic curve to the ideal curve in each of the plurality of intervals, according to a ratio of the first difference value to the second difference value in each of the plurality of intervals.

10. The device according to claim 9, further comprising:
a light intensity determining module, configured to, before the ratio determining module determining the ratio of the characteristic curve of the proximity sensor to the ideal curve of the proximity sensor in each of the plurality of intervals, acquire a light intensity value of the current ambient light, determine whether the light intensity value exceeds a light intensity threshold; and determine a mobile terminal being in a bright environment when the light intensity value exceeds the light intensity threshold.

11. The device according to claim 9, wherein the signal compensation module is configured to:
turn on the transmitting end of the proximity sensor at a first preset sampling time, and obtain the first intensity value from the receiving end of the proximity sensor;
turn off the transmitting end of the proximity sensor at a second preset sampling time, and obtain a second intensity value from the receiving end of the proximity sensor; and
correct the first intensity value and the second intensity value, according to the ratio of the characteristic curve to the ideal curve in a first setting interval corresponding to the first intensity value, and the ratio of the characteristic curve to the ideal curve in a second setting interval corresponding to the second intensity value.

12. The device according to claim 9, wherein the first screen control module is configured to:
determine a difference of the compensated first intensity value and the compensated second intensity value as the compensated second intensity value;
control the screen off when the corrected proximity value is greater than the first threshold; and control the screen on when the corrected proximity value is less than the second threshold.

13. The device according to claim 9, wherein the ratio determining module is configured to set different fitting accuracy according to different ambient light intensity value, and determine the ratio of the characteristic curve to the ideal curve in the plurality of intervals corresponding to each fitting accuracy;
the device further comprises a light intensity acquiring module configured to acquire a light intensity value of the current ambient light, and determine a target fitting accuracy corresponding to the ambient light intensity value range to which the light intensity value belongs;
the signal compensation module configured to obtain a first intensity value of a receiving end signal when a transmitting end of the proximity sensor is turned on, and a second intensity value of a receiving end signal when the transmitting end of the proximity sensor is turned off, is configured to compensate the first intensity value and the second intensity value according to the ratio of the characteristic curve to the ideal curve in the corresponding target fitting accuracy.

14. The device according to claim 10, further comprising a second screen control module configured to, when the light intensity value fails to exceed the light intensity threshold, acquire the first intensity value and the second intensity value, use the difference of the first intensity value and the second intensity value as a corrected proximity value of the proximity sensor, and control the screen selectively in the screen on stated and the screen off state, according to a comparison result of the corrected proximity value and the preset threshold.

15. A mobile terminal comprising a memory, a processor, and a computer program stored therein and executable on the processor, the processor executing the computer program to implement a method comprising the steps of:
determining, a ratio of a characteristic curve of a proximity sensor to an ideal curve of the proximity sensor in each of a plurality of intervals;
obtaining a first intensity value of a receiving end signal when a transmitting end of the proximity sensor is in a first state, obtaining a second intensity value of a receiving end signal when the transmitting end of the proximity sensor is in a second state different fron the first state, and respectively compensating the first intensity value and the second intensity value respectively according to the ratio; and determining a corrected proximity value of the proximity sensor according to a compensated first intensity value and a compensated second intensity value, and controlling a screen, according to a comparison result between the corrected proximity value and a preset threshold, to be selectively in a screen on state or a screen off state;

wherein determining a ratio of a characteristic curve of the proximity sensor to an ideal curve in each of a plurality of intervals comprises:

dividing the characteristic curve of the proximity sensor into a plurality of first line segments by the plurality of intervals, and dividing the ideal curve of the proximity sensor into a plurality of second line segments by the plurality of intervals, wherein the plurality of intervals each has an equal length;

obtaining first patterns formed by each of the first line segments of the characteristic curve and an orthographic projection of each of the first line segments of the characteristic curve on the abscissa axis;

obtaining second patterns formed by each of the second line segments of the ideal curve and an orthographic projection of each of the second line segments of the ideal curve on the abscissa axis; and determining the ratio of the characteristic curve to the ideal curve in each of the plurality of intervals according to an area ratio of the first pattern to the second pattern in each of the plurality of intervals.

16. The device according to claim 11, wherein the first screen control module is configured to:

determine a difference of the compensated first intensity value and the compensated second intensity value as the compensated second intensity value;

control the screen off when the corrected proximity value is greater than the first threshold; and control the screen on when the corrected proximity value is less than the second threshold.

* * * * *